No. 652,340. Patented June 26, 1900.
E. VOHSEN.
GLOBE FOR INDICATING TRADE ROUTES, &c.
(Application filed Mar. 10, 1900.)
(No Model.)
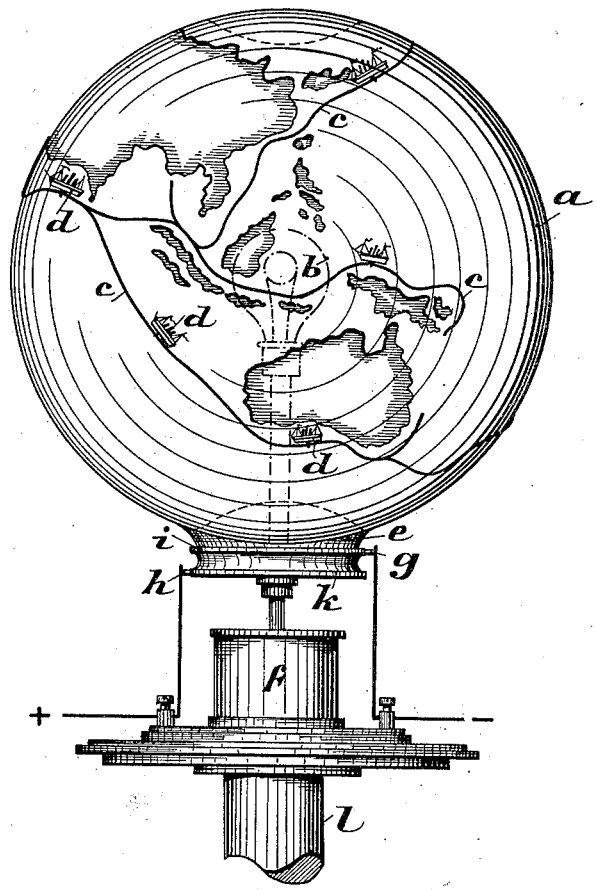
WITNESSES:
Ernst Vohsen
INVENTOR:

UNITED STATES PATENT OFFICE.

ERNST VOHSEN, OF BERLIN, GERMANY, ASSIGNOR TO THE FIRM OF DIETRICH REIMER, OF SAME PLACE.

GLOBE FOR INDICATING TRADE-ROUTES, &c.

SPECIFICATION forming part of Letters Patent No. 652,340, dated June 26, 1900.

Application filed March 10, 1900. Serial No. 8,129. (No model.)

*To all whom it may concern:*

Be it known that I, ERNST VOHSEN, a subject of the German Emperor, residing at Königgrätzerstrasse 110, Berlin, Germany, have invented a certain new and useful Globe for Indicating Trade-Routes, &c.; and I do hereby declare the following to be a full, clear, and exact description of the invention, such as will enable others skilled in the art to which it appertains to make and use the same.

This invention relates to a globe adapted to show trade-routes on sea and land and the positions of ships or other transports thereon.

The accompanying drawing is an elevation of a globe constructed according to this invention.

The globe $a$ is translucent and carries a translucent map. Inside the globe is any suitable source of illumination, such as an electric lamp $b$ or a petroleum-lamp, or an acetylene or any other gas burner, so that the map can be read independently of external light.

The trade-routes are represented by strips of cork or the like $c$, attached to the globe. To indicate the positions of ships or the like, small models $d\ d$, made of celluloid or other suitable material, are provided with pins, which may be stuck into the cork. These models are shifted day by day to indicate the progress of the transport.

The globe is carried at its south pole on a disk $e$, connected with a clockwork mechanism $f$, which rotates the globe from its east to its west, so that the observer may follow the course of the transports.

Suitable openings, as indicated in dotted lines, may be provided at the two poles of the globe if a combustible illuminant is used inside the globe.

When electricity is the source of light, the current is conducted through the copper pins $g\ h$, which slide on the copper rings $i\ k$, so that contact is not broken by the rotation of the globe. The apparatus stands on a table $l$ about one meter high, so that the globe may be convenient for observation.

Having now particularly described and ascertained the nature of this invention and what manner the same is to be performed, I declare that what I claim is—

1. A globe for indicating trade-routes and the position of transports thereon consisting of a translucent globe, illuminated from within and carrying a translucent map on which the said routes are represented by strips of a soft material.

2. A globe for indicating trade-routes and the position of transports thereon consisting of a translucent globe, illuminated from within and carrying a translucent map on which the said routes are represented by strips of a soft material, in which strip-pins bearing models of transports may be inserted.

3. A globe for indicating trade-routes and the position of transports thereon consisting of a translucent globe, illuminated from within and carrying a translucent map on which the said routes are represented by strips of cork, in which strip-pins bearing models of transports may be inserted.

4. In a device for indicating trade-routes and the position of transports thereon, the combination with a translucent globe carrying a translucent map, of means for illuminating said globe from within, trade-routes indicated on said globe by strips of material dissimilar to the material of the body of the globe, and means for indicating the position of transports on said strips.

5. In a device for indicating trade-routes and the position of transports thereon, the combination with a translucent globe carrying a translucent map, of means for illuminating said globe from within, trade-routes indicated on said globe by strips of material dissimilar from the material of the body of the globe, and means for detachably securing models of transports to said strips.

6. A globe for indicating trade-routes and the position of transports thereon consisting of a translucent globe, illuminated from within by an electric lamp and carrying a translucent map on which the said routes are represented by strips of soft material in combination with two sliding contact-rings and conducting-pins for supplying electric current.

7. A globe for indicating trade-routes and the position of transports thereon consisting of a translucent globe, illuminated from within by an electric lamp and carrying a translucent map on which the said routes are represented by strips of soft material and models of transports inserted by pins in the said strips in combination with sliding contact-rings and conducting-pins for supplying electric current.

In witness whereof I have hereunto set my hand in presence of two witnesses.

ERNST VOHSEN.

Witnesses:
   WOLDEMAR HAUPT,
   HENRY HASPER.